United States Patent
Storti

(10) Patent No.: US 12,518,617 B2
(45) Date of Patent: Jan. 6, 2026

(54) MODULAR ALARM INTERFACE

(71) Applicant: DISH Network L.L.C., Englewood, CO (US)

(72) Inventor: Gabriel Jose Storti, Cheyenne, WY (US)

(73) Assignee: DISH Network L.L.C., Englewood, CO (US)

( * ) Notice: Subject to any disclaimer, the term of this patent is extended or adjusted under 35 U.S.C. 154(b) by 171 days.

(21) Appl. No.: 18/436,443

(22) Filed: Feb. 8, 2024

(65) Prior Publication Data

US 2025/0259532 A1 Aug. 14, 2025

(51) Int. Cl.
*G08B 31/00* (2006.01)
*G06F 3/0486* (2013.01)

(52) U.S. Cl.
CPC ............ *G08B 31/00* (2013.01); *G06F 3/0486* (2013.01); *G06F 2203/04806* (2013.01)

(58) Field of Classification Search
CPC .................. G08B 31/00; G06F 3/0486; G06F 2203/04806
See application file for complete search history.

(56) References Cited

U.S. PATENT DOCUMENTS

| | | | | |
|---|---|---|---|---|
| 6,249,223 | B1* | 6/2001 | Christensen | G08B 25/06 340/538 |
| 2012/0133481 | A1* | 5/2012 | Dedek | G08B 25/14 340/5.2 |
| 2018/0091528 | A1* | 3/2018 | Shahbaz | G06F 21/554 |
| 2020/0058215 | A1* | 2/2020 | Novak | A61M 5/142 |
| 2023/0209321 | A1* | 6/2023 | Suryadi | H04W 4/38 455/404.2 |
| 2023/0325226 | A1* | 10/2023 | Malik | G06F 9/45558 718/1 |
| 2024/0231348 | A1* | 7/2024 | Schenk | G06F 30/20 |

* cited by examiner

*Primary Examiner* — Tadesse Hailu
(74) *Attorney, Agent, or Firm* — Kipman Tyler Werking; Frontier IP Law PPLC

(57) ABSTRACT

A disclosed method may include (i) providing a graphical user interface that includes a plurality of modular alarm units that are each directed to a respective and different subsystem that contributes to a same production cycle of a direct broadcast satellite product or service and that are each connected to at least one other modular alarm unit in the plurality of modular alarm units via a respective dependency relationship, (ii) receiving user input indicating a rearrangement of an orientation of the plurality of modular alarm units, and (iii) based on a modified at least one dependency relationship, determining an origin of an issue causing respective alerts generated for multiple alarm units of the plurality of modular alarm units.

20 Claims, 11 Drawing Sheets

MODULAR ALARM INTERFACE

BRIEF SUMMARY

This disclosure is generally directed to a modular alarm interface. The technology of this disclosure may help to address a problem according to which different departments or employees within an organization may have limited visibility into, or awareness of, work and contextual information associated with other departments and employees within the same organization. Accordingly, the technology of this application may help to provide a single graphical user interface, which can take the form of a "single pane of glass," to provide a higher-level and more comprehensive overview of how the work within one department or subsystem can contribute to, and fit within the context of, a larger production cycle as discussed further below.

In one example, a method may include (i) providing a graphical user interface that includes a plurality of modular alarm units that are each directed to a respective and different subsystem that contributes to a same production cycle of a direct broadcast satellite product or service and that are each connected to at least one other modular alarm unit in the plurality of modular alarm units via a respective dependency relationship, (ii) for each modular alarm unit of the plurality of modular alarm units: monitoring the respective and different subsystem to which the modular alarm unit is directed and generating an alert when a status of the respective and different subsystem is deficient according to a respective metric, (iii) receiving user input indicating a rearrangement of an orientation of the plurality of modular alarm units, (iv) in response to receiving the user input indicating the rearrangement: updating the graphical user interface by rearranging the orientation of the plurality of modular alarm units based on the user input indicating the rearrangement and modifying at least one dependency relationship between two modular alarm units of the plurality of modular alarm units based on the user input indicating the rearrangement, and (v) based on the modified at least one dependency relationship, determining an origin of an issue causing respective alerts generated for multiple alarm units of the plurality of modular alarm units.

In some examples, a supervised machine learning model is trained on a corpus of data that is labeled to indicate dependency relationships within the plurality of modular alarm units and the supervised machine learning model, after training, is configured to infer where one or more dependency relationships would exist in an unlabeled second corpus of data.

In some examples, at least three respective and different subsystems that contribute to the same production cycle for the direct broadcast satellite product or service include at least three of a content acquisition subsystem, an inbound subsystem, a processing subsystem, an outbound subsystem, or a customer subsystem.

In some examples, the graphical user interface displays an option for toggling a layer filter and the layer filter, when toggled, adjusts a display of each modular alarm unit of the plurality of modular alarm units such that any modular alarm units that are included within a predefined layer are filtered from displaying.

In some examples, the graphical user interface enables a user to perform a drag and drop operation on a first modular alarm unit of the plurality of modular alarm units.

In some examples, the graphical user interface automatically updates, as a default, information that indicates a dependency relationship between the first modular alarm unit and a second modular alarm unit in response to the drag and drop operation.

In some examples, the graphical user interface defines a parent-child relationship hierarchy for the plurality of modular alarm units and the graphical user interface enables zooming in or out to render visible or invisible one or more members of the plurality of modular alarm units based on how deep a level of zoom is achieved.

In some examples, the alert comprises a static color, an animated alarm, or an audio alarm.

In some examples, the graphical user interface enables a user to edit a name of the respective and different subsystem.

In some examples, each respective and different modular alarm unit includes a hyperlink to a website that enables editing of the respective and different subsystem that contributes to a same production cycle of a product or service.

In some examples, a system comprises at least one physical computing processor of a computing device and a non-transitory computer-readable medium that has instructions stored thereon that, when executed by the at least one physical computing processor, cause the computing device to perform operations including providing a graphical user interface that includes a plurality of modular alarm units that are each directed to a respective and different subsystem that contributes to a same production cycle of a direct broadcast satellite product or service and that are each connected to at least one other modular alarm unit in the plurality of modular alarm units via a respective dependency relationship, (ii) for each modular alarm unit of the plurality of modular alarm units: monitoring the respective and different subsystem to which the modular alarm unit is directed and generating an alert when a status of the respective and different subsystem is deficient according to a respective metric, (iii) receiving user input indicating a rearrangement of an orientation of the plurality of modular alarm units, (iv) in response to receiving the user input indicating the rearrangement: updating the graphical user interface by rearranging the orientation of the plurality of modular alarm units based on the user input indicating the rearrangement and modifying at least one dependency relationship between two modular alarm units of the plurality of modular alarm units based on the user input indicating the rearrangement, and (v) based on the modified at least one dependency relationship, determining an origin of an issue causing respective alerts generated for multiple alarm units of the plurality of modular alarm units.

In some examples, a non-transitory computer-readable medium has instructions stored thereon that, when executed by the at least one physical computing processor, cause the computing device to perform operations including providing a graphical user interface that includes a plurality of modular alarm units that are each directed to a respective and different subsystem that contributes to a same production cycle of a direct broadcast satellite product or service and that are each connected to at least one other modular alarm unit in the plurality of modular alarm units via a respective dependency relationship, (ii) for each modular alarm unit of the plurality of modular alarm units: monitoring the respective and different subsystem to which the modular alarm unit is directed and generating an alert when a status of the respective and different subsystem is deficient according to a respective metric, (iii) receiving user input indicating a rearrangement of an orientation of the plurality of modular alarm units, (iv) in response to receiving the user input indicating the rearrangement: updating the graphical user interface by rearranging the orientation of the plurality of modular alarm units based on the user input indicating the rearrangement and modifying at least one dependency relationship between two modular alarm units of the plurality of modular alarm units based on the user input indicating the rearrangement, and (v) based on the modified at least one dependency relationship, determining an origin of an issue causing respective alerts generated for multiple alarm units of the plurality of modular alarm units.

BRIEF DESCRIPTION OF THE DRAWINGS

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
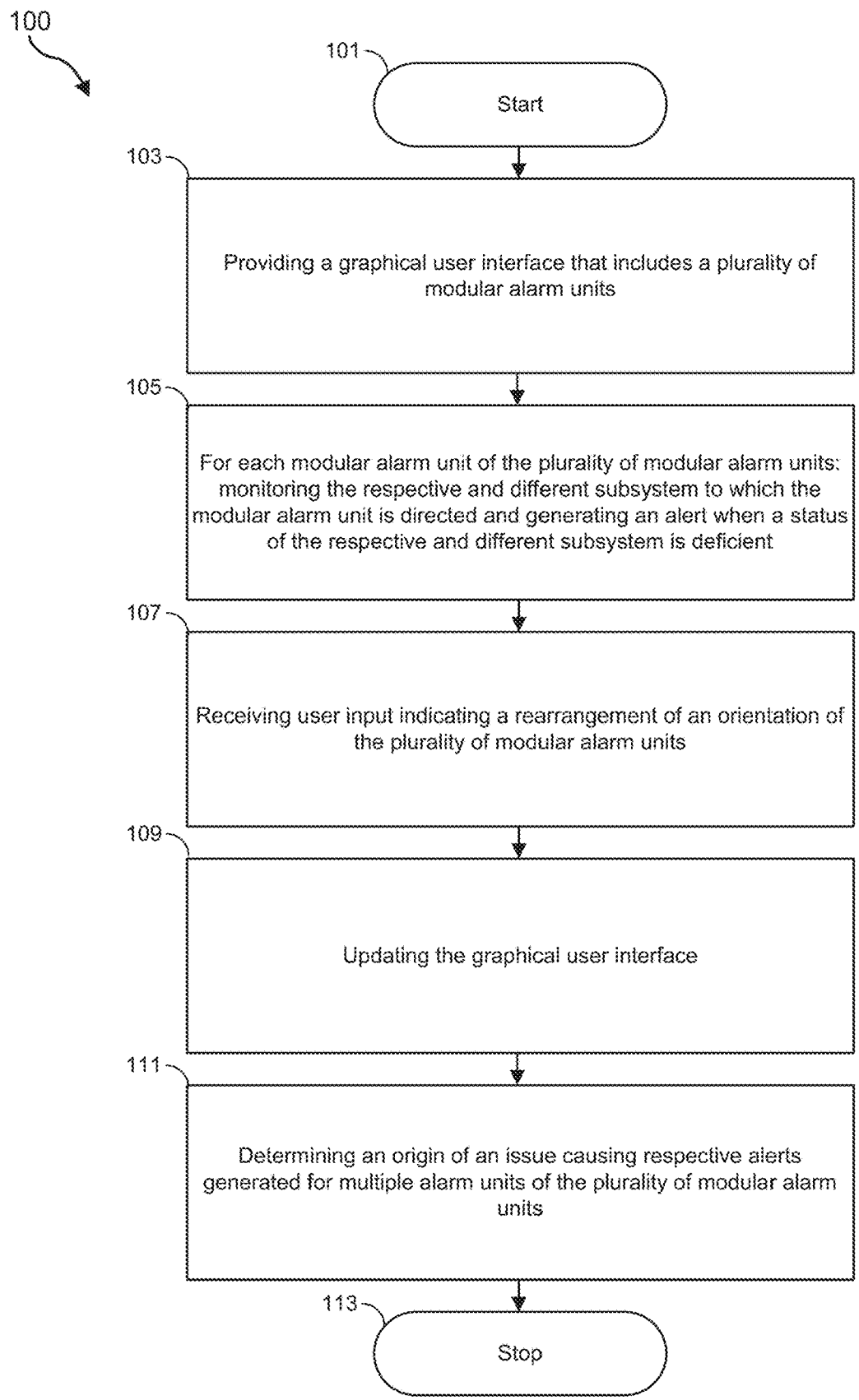
FIG. 1 shows a flow diagram for a method relating to a modular alarm interface.

FIG. 1 shows a flow diagram for an example method 100 relating to a modular alarm interface. At step 101, method 100 may start or begin. At step 103, method 100 may include providing a graphical user interface that includes a plurality of modular alarm units that are each directed to a respective and different subsystem that contributes to a same production cycle of a direct broadcast satellite product or service and that are each connected to at least one other modular alarm unit in the plurality of modular alarm units via a respective dependency relationship. At step 105, method 100 may include, for each modular alarm unit of the plurality of modular alarm units: monitoring the respective and different subsystem to which the modular alarm unit is directed and generating an alert when a status of the respective and different subsystem is deficient according to a respective metric. At step 107, method 100 may include receiving user input indicating a rearrangement of an orientation of the plurality of modular alarm units. At step 109, method 100 may include, in response to receiving the user input indicating the rearrangement: updating the graphical user interface by rearranging the orientation of the plurality of modular alarm units based on the user input indicating the rearrangement and modifying at least one dependency relationship between two modular alarm units of the plurality of modular alarm units based on the user input indicating the rearrangement. At step 111, method 100 may include, based on the modified at least one dependency relationship, determining an origin of an issue causing respective alerts generated for multiple alarm units of the plurality of modular alarm units. At step 113, method 100 may stop or conclude.

As used herein, the term "modular alarm interface" can refer to an interface that includes modular components and that includes one or more dynamic alarms. As used herein, the term "modular" can refer to components within a production process or cycle and/or components that are substitutable with each other and/or that can be rearranged with respect to each other. As used herein, the term "modular alarm unit" can refer to a unit or component within a modular alarm interface. As used herein, the phrase "rearranging an orientation" can refer to adjusting or reorienting at least one modular alarm unit with respect to another modular alarm unit. As used herein, the phrase "is directed to" can refer to a modular alarm unit having functionality that is primarily, predominantly, for a majority, or entirely specific to one subsystem of a production cycle as distinct from another subsystem. As used herein, the term "production cycle" can refer to any process for providing a product or service. As used herein, the term "same production cycle" can refer to each one of multiple modular alarm units being directed to different subsystems where each of those different subsystems contributes to the same product or service.

As one illustrative example, one modular alarm unit may be directed to designing a sneaker shoe, another modular alarm unit may be directed to preparing the sole of the sneaker shoe, another modular alarm unit may be directed to shoestrings of the sneaker shoe, and/or another modular alarm unit may be directed to the packaging of the sneaker shoe. In this illustrative example, each of these different modular alarm units are directed to different subsystems (e.g., design, sole, shoestrings, packaging) that provide unique or substantially unique contributions to the same product or service, which is the sneaker shoe. The discussion of the sneaker shoe is merely one example for illustrative purposes. One or more of the inventive concepts of this application can be applied broadly to any product or service in the global economy that involves multiple distinct subsystems as part of its production or manufacturing.

As used herein, the phrase "deficient according to a respective metric" can refer to a metric that is specific to a corresponding subsystem making a contribution to the production or provisioning of a product or service. In other words, different metrics can be used for different respective subsystems, because these different subsystems can generally have different expected or desired outputs or performance metrics. For example, a metric for the design of the sneaker shoe may indicate that the design subsystem is deficient if the design is completed or finalized beyond a predetermined due date. Additionally, or alternatively, a metric for the packaging of the sneaker shoe may indicate that the packaging is deficient if the packaging has holes or breaks down without safely or appropriately protecting the sneaker shoe from external wear and tear.

The above discussion of terminology is intended to help illuminate the meaning of corresponding terms. In general, the terminology should be interpreted consistent with the figures even though the limitations of the figures are not strictly or necessarily incorporated into the claims.

Figure 2:
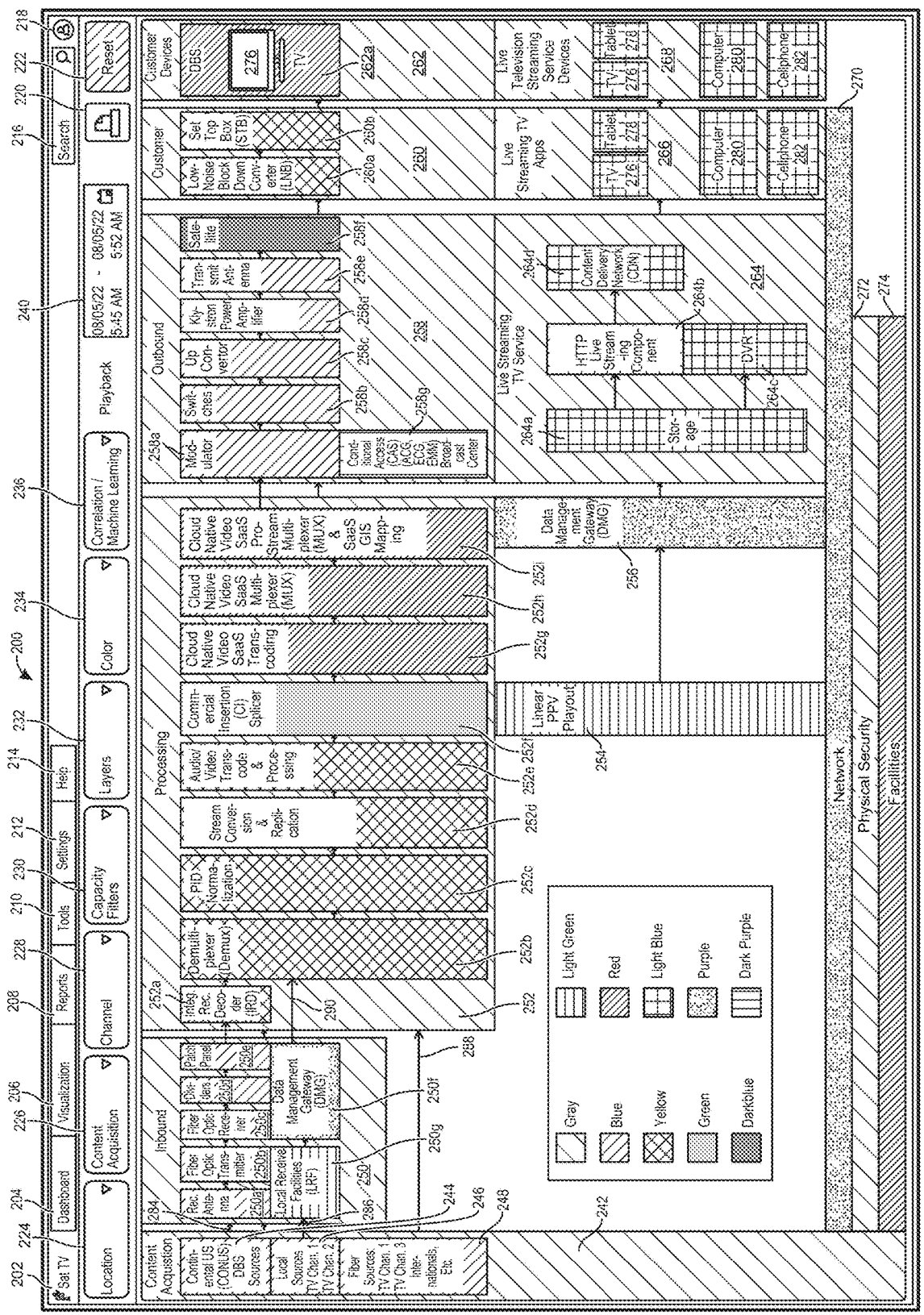
FIG. 2 shows a diagram of a graphical user interface for implementing a modular alarm interface in which the modular alarm interface is color-coded to designate different departments within an organization.

FIG. 2 shows a diagram 200 of a graphical user interface corresponding to a modular alarm interface, as discussed above. In particular, FIG. 2 shows a graphical user interface for implementing a modular alarm interface in which the modular alarm interface is color-coded to designate different departments within an organization. An icon 202 may indicate that, in this example, the modular alarm interface provides an interface relating to the production cycle of a product or service from a satellite television vendor. Nevertheless, as discussed above in connection with the example of the sneaker shoe, one or more of the inventive concepts outlined in this disclosure may apply broadly to any suitable product or service according to which multiple distinct subsystems make differing or unique contributions to the production of the same product or service.

As further shown within diagram 200, the modular alarm interface may include a headline banner of distinct buttons 204-214, including buttons for a dashboard 204, a visualization 206, reports 208, tools 210, settings 212, and help 214. One focus of this application and the remaining figures may correspond to visualization 206. Diagram 200 also further shows how the modular alarm interface may include drop-down menus 224-236. Drop-down menu 224 may enable the user to filter one or more aspects of the display of the corresponding modular alarm interface based upon the selection or toggling of one or more distinct locations, consistent with the discussion of FIG. 9 below. Drop-down menu 226 may enable the user to filter one or more aspects of the display of the corresponding modular alarm interface based upon the selection or toggling of one or more higher-level modular alarm units or lower-level modular alarm units. Drop-down menu 228 may enable the user to filter one or more aspects of the display of the corresponding modular alarm interface based upon the selection or toggling of one or more distinct television channels or content channels, including those shown within this figure. Drop-down menu 230 may enable the user to filter one or more aspects of the display of the corresponding modular alarm interface based on one or more inputs to, or interactions with, a capacity filter, as discussed in further detail below in connection with FIG. 3. Drop-down menu 232 may enable the user to filter one or more aspects of the display of the corresponding modular alarm interface based upon the selection or toggling of one or more layers, consistent with the discussion of FIG. 5 below.

Drop-down menu 234 may enable the user to toggle on or off a mode that color codes the modular alarm units according to the respective departments to which the modular alarm units are assigned, or otherwise belong, within an organization chart. As shown, diagram 200 corresponds to an example where the user has manipulated drop-down menu 234 to enable the mode where the modular alarm units are color-coded according to the respective department assignments. Additionally, or alternatively, drop-down menu 236 may enable or toggle a component for correlation processing or inferencing, such as machine learning inferencing, as discussed further below.

Playback indicator 240 may enable a user to repeat or animate a previous state, or series of states, of the modular alarm interface. In the example of this figure, the user has specified a date and time range between Aug. 5, 2022 5:45 AM and Aug. 5, 2022 5:52 AM. Additionally, or alternatively, in other examples the user may specify one or more different ranges using different levels of granularity or precision, etc. Thus, in this example, the modular alarm interface might replay or animate one or more frames, states, and/or displays of the modular alarm interface. Accordingly, if the configuration and/or arrangement of the different modular alarm units within the modular alarm interface differed, changed, or reoriented themselves during this time range then the series of changes, in an animated form, might be replayed as if the information was being displayed live. In further examples, the user can specify a single historical or archived state of the modular alarm interface to replay or reproduce. The example of this figure also includes a search bar 216, a printer button 220 (allowing the exporting of data from the system in multiple formats such as PDF, XML, etc., as well as the creation of a live shareable link for others to view the live modular interface), a reset button 222, and a profile indicator 218, as shown.

Within the modular alarm interface, and below the buttons and drop-down menus that are listed described above, are included the various modular alarm units of this example. As shown, modular alarm units may be color-coded according to a respective department to which each respective modular alarm unit has been assigned. Additionally, or alternatively, diagram 200 also further indicates how modular alarm units may be interrelated with respect to each other according to parent-child relationships or composition relationships. Accordingly, some modular alarm units may form higher-level composition relationships such that these modular alarm units include lower-level modular alarm units, as shown. In the example of diagram 200, higher-level modular alarm units may include content acquisition 242, inbound 250, processing 252, outbound 258, customer 260, and/or customer devices 262, for example. In particular, content acquisition 242 may include continental United States direct broadcast satellite sources 244, local sources 246, and fiber sources 248. Accordingly, in some examples, the production cycle of method 100 includes a production cycle for a direct broadcast satellite product or service.

Inbound 250 may include receive antenna 250a, fiber-optic transmitter 250b, fiber-optic receiver 250c, dividers 250d, patch panel 250e, local receive facilities 250g, and a data management gateway 250f. Processing 252 may include an integrated receive decoder 252a, a demultiplexer 252b, a PID normalization component 252c, a stream conversion and replication component 252d, an audio/video transcoding and processing component 252e, a commercial insertion splicer 252f, a cloud native video software as a service transcoding component 252g, a cloud native video software as a service multiplexer component 252h, and a cloud native video software as a service multiplexer and geographic information system mapping component 252i. Processing 252 may also optionally include a linear pay-per-view play out component 254 and/or a data management gateway 256, as shown.

Similarly, outbound 258 may further include a modulator 258a, switches 258b, and up converter 258c, a Klystron power amplifier 258d, a transmit antenna 258e, a satellite 258f, and/or conditional access broadcast center 258g. A live television streaming service 264 may include storage 264a, a hypertext transfer protocol live streaming component 264b, a content delivery network 264d, and a digital video recorder component 264c. Customer 260 may include a low-noise block down converter 260a and a set-top box component 260b. Customer devices 262 may include a direct broadcast satellite component 276.

Live television streaming service applications 266 may include applications for a television 276, a tablet 278, a computer 280, and a cellular phone 282, as shown. Live television streaming service devices 268 may refer to the same devices.

Diagram 200 also indicates how one or more of the modular alarm units listed above may depend upon a network 270, physical security 272, and/or facilities 274. More generally, diagram 200 indicates arrows between different members of pairs of the modular alarm units, such as the arrow between outbound 258 and customer 260, or between low-noise block down converter 260a and set-top box 260b, as shown. These arrows generally proceed from left to right within diagram 200 indicating a chronological progression and/or a causal relationship that proceeds from the left, in terms of an earlier cause, to the right, in terms of a later or subsequent effect as part of the overall production cycle for a corresponding product or service associated with direct broadcast satellite services.

The predominant use of the left to right arrows within diagram 200 is merely illustrative and, in other examples, arrows may be oriented in any suitable direction or using any suitable connector with multiple turns or kinks, to thereby indicate appropriate dependency relationships. For example, one or more of the modular alarm units aligned vertically with network 270 can thereby indicate that these modular alarm units depend upon network 270 in order to operate. Similarly, one or more modular alarm units can be aligned vertically with physical security 272 and facilities 274, thereby indicating that these modular alarm units depend upon physical security 272 and facilities 274. Accordingly, arrows can optionally be displayed, from bottom to top in a vertical manner, indicating this dependency relationship. In some examples, the dependency relationship may be binary or Boolean in the sense of indicating that one modular alarm unit does, or does not, depend upon another modular alarm unit. In other words, such dependency relationships, when indicated within the modular alarm interface, can further indicate to a user that a subsystem that contributes to the overall production of a product or service can depend upon another subsystem that also further makes an additional contribution to the product or service, where both of these subsystems are associated or assigned to respective modular alarm units in accordance with the discussion of diagram 200 above.

As further shown within diagram 200, the dependency relationships can include higher-level dependency relationships between higher-level modular alarm units, such as content acquisition 242 and inbound 250. Additionally, or alternatively, the dependency relationships can include lower level dependency relationships between lower-level modular alarm units, such as the dependency relationship between fiber-optic transmitter 250b and fiber-optic receiver 250c.

Additionally, or alternatively, one or more of the dependency relationships may be scaled, discrete, analog, and/or continuous, as distinct from binary or Boolean, thereby indicating that one modular alarm unit can have a dependency relationship with another modular alarm unit that can vary gradually along a scale, or in terms of degree, such that one example dependency relationship might be much stronger (e.g., 90% dependency) than another example dependency relationship, which may be much weaker (e.g., 10% dependency). In the example of the weaker dependency relationship, the failure of a base modular alarm unit might mildly diminish the performance of a target modular alarm unit without necessarily causing the target modular alarm unit to entirely fail, for example.

As discussed above, the overall context of diagram 200 may indicate a general sweep or direction from left to right in terms of chronology and/or in terms of causality. Accordingly, the modular alarm interface may be intelligent enough, in some examples, to automatically suggest or populate a dependency relationship arrow, as discussed above, simply due to the location or placement of a particular modular alarm unit by the user. For example, when the user places or disposes of modular alarm unit on the right-hand side of another modular alarm unit, then the modular alarm unit might suggest or automatically populate a dependency relationship from left to right that connects these two modular alarm units. The rearrangement of modular alarm units and/or corresponding dependency relationship arrows and relationships can be discussed further below in connection with the remaining figures of this application, including FIG. 7, for example.

Additionally, or alternatively, in other examples the modular alarm interface can enable the user to manually designate the dependency relationship. For example, the modular alarm interface might enable the user to interact with a sub-window, pop-up, wizard, and/or other interface component, which can receive one or more of the following items of information: identification or selection of a first modular alarm unit, identification or selection of a second modular alarm unit, an indication of a direction of chronology, causality, or dependency (i.e., which modular alarm unit depends upon which other modular alarm unit), and/or a type of the dependency relationship (e.g., binary or granular), etc. Upon entering corresponding items of information, the user can finalize the creation of the dependency relationship within the modular alarm interface at least in part by entering a corresponding input command. In response, the modular alarm interface may optionally display a graphical indication, or other input, indicating that the input command has been successfully processed. In further examples, the modular alarm interface may create a dependency relationship arrow, analogous to the arrows shown within diagram 200, to thereby indicate to the user that the dependency relationship has been created within the interface.

In the context of machine learning, one or more machine learning methodologies may be used to extract, derive, or infer new information or knowledge based on training procedures performed on a corpus of training data. According to supervised machine learning, the corpus of training data may be labeled. For example, data describing one or more modular alarm units and/or their arrangement may be labeled with information indicating the relationship for one or more different pairs of the modular alarm units. This information can correspond to the information described above that the modular alarm interface can automatically populate or that the user can manually input, for example. Generally speaking, information can identify a base or originating modular alarm unit (e.g., the cause) as well as a target or recipient modular alarm unit (e.g., the effect) consistent with a dependency relationship and corresponding direction of chronology or causality, as discussed. Because the corpus of training data is labeled, the corresponding machine learning model generated as the output of the training procedures can be more accurate. The machine learning model can effectively learn to infer where one or more dependency relationships would exist. Accordingly, the machine learning model can recommend for the user to populate or confirm such a recommended dependency relationship. The machine learning model can also draw to the user's attention dependency relationships or patterns of such relationships that might otherwise have been obscured or inconspicuous from the perspective of the user.

Additionally, or alternatively, an unsupervised machine learning model can be trained upon a corpus of training data that is not necessarily labeled. One helpful embodiment for unsupervised machine learning methodologies can include clustering algorithms. Accordingly, the unsupervised machine learning model could extract or identify clusters of different modular alarm units. For example, the unsupervised machine learning model can identify a cluster of interrelated or interconnected modular alarm units, and their respective subsystems within the organization, where these are related in a manner that differs from the corresponding organization chart or hierarchy. In such examples, although most modular alarm units within a cluster would have been previously associated with each other in the organization chart or hierarchy, another modular alarm unit could have been associated with a different department, even if this modular alarm unit would be better, more accurately, more efficiently, or more profitably associated with the remaining modular alarm units of this cluster as identified by the machine learning model. In further examples, the corpus of training data may include data identifying both the modular alarm units and their dependency relationships, where the dependency relationships are not considered to be "labels" in the strict or formal sense of machine learning. In such examples, an unsupervised machine learning algorithm can be used to identify clusters of modular alarm units and their associated dependency relationships, even without the use of a formal supervised machine learning algorithm, as discussed above.

By way of illustrative example, either supervised or unsupervised machine learning methodologies may be used to infer a dependency relationship that was previously unknown or unlabeled. For example, a sequence of six different modular alarm units might trigger in a sequential relationship over time or in terms of causality. Accordingly, the six different modular alarm units should ideally be labeled with five different dependency relationships in the corresponding chain of the sequential relationship. Nevertheless, for any reason, one of these five different dependency relationships might be missing in this example. Accordingly, using either supervised or unsupervised machine learning, the missing dependency relationship within the chain of dependency relationships might be inferred due to the training data indicating a partial chain of dependency relationships on both sides of the missing dependency relationship such that the missing dependency relationship, if labeled properly, would complete the entire chain. This example is merely illustrative and, in other examples, machine learning methodologies can be used to infer dependency relationships and/or other patterns that might be more subtle, inconspicuous, and/or complicated, etc.

The example of diagram 200 may also be user-editable or user-customizable by different users or teams within an organization. The example of diagram 200 focuses upon a particular product or service associated with direct broadcast satellite services. Nevertheless, in additional or alternative examples, such a product or service may be just one product or service within an organization, such as a parent corporation or vendor providing such services. Moreover, different teams, departments, and/or subsets within such a parent corporation or organization might have different viewpoints or opinions regarding how modular alarm units should be associated or rearranged with respect to each other, and with respect to their dependency relationships. Accordingly, in some examples, the modular alarm interface may enable one or more users, employees, teams, departments, etc., to create and/or modify their own modular alarm unit displays, hierarchy, and/or modular alarm unit arrangements. In other words, the particular hierarchy or arrangement shown within diagram 200 may be merely one example that is preferred by one team or department within the parent organization, whereas another team or department prefers a different hierarchy or arrangement. Similarly, some parts of the arrangement shown within diagram 200 may be irrelevant or less relevant to another team or department. Accordingly, a different team or department may select or designate a different number of modular alarm units and/or rearrange those modular alarm units in a different configuration or hierarchy, according to the team's own preferences.

In some examples, when a team seeks to customize, personalize, and/or adjust a configuration or hierarchy of modular alarm units, the team may have the option to insert an instance of a modular alarm unit for any subsystem within the parent organization and/or for any subsystem to which the particular team might have access privileges, which can be determined by the parent organization. In some examples, every subsystem within a large set of subsystems under the parent organization may be requested to, or required to, provide input to a corresponding application programming interface of the modular alarm interface such that any user, administrator, team, or department, when given access privileges, can insert an instance of such a modular alarm unit within its own user-customizable configuration or hierarchy of modular alarm units. Due to the usage of the application programming interface, each different instance of the same modular alarm interface might appropriately monitor and/or input telemetry or other information from that subsystem, which can be used and/or reported, within the various different configurations and/or hierarchies used by the different users, administrators, and/or teams within their respective graphical user interfaces corresponding to the modular alarm interface. In some specific examples, a user on one team may have access to a drop-down menu that specifies each modular alarm unit within the parent organization and/or to which the user or team has access privileges. Upon selecting a particular type of modular alarm unit, the user can locate, place, adjust, orient, and/or configure the instance of that particular type of modular alarm unit within the corresponding hierarchy or arrangement of modular alarm units with which the user is currently working.

The customizability of the modular alarm interface can help address the problem of siloing of information whereby one team might remain effectively sealed or cut off from one or more items of meaningful information that is associated with another team or department. In other words, granting access privileges to a large number or set of modular alarm units to any particular team may enable a particular team to have greater visibility into the overall production cycle to which that particular team is contributing. In this manner, the team can quickly develop or gain greater insight, context, and/or understanding into the overall production cycle associated with the end goal of the product or service to which their work has contributed. The team can furthermore develop a greater understanding of how its work can affect, or have an impact on, the work of other teams or departments and vice versa. In some examples, all the different subsystems associated with a particular production cycle and/or associated with a large set of subsystems, may be displayed within a single graphical user interface, a single graphical user interface window, and/or a single two-dimensional "pane of glass" to provide a higher-level perspective that more quickly provides information and insights to users, employees, administrators, teams, and/or departments, etc., As further discussed above.

Figure 3:
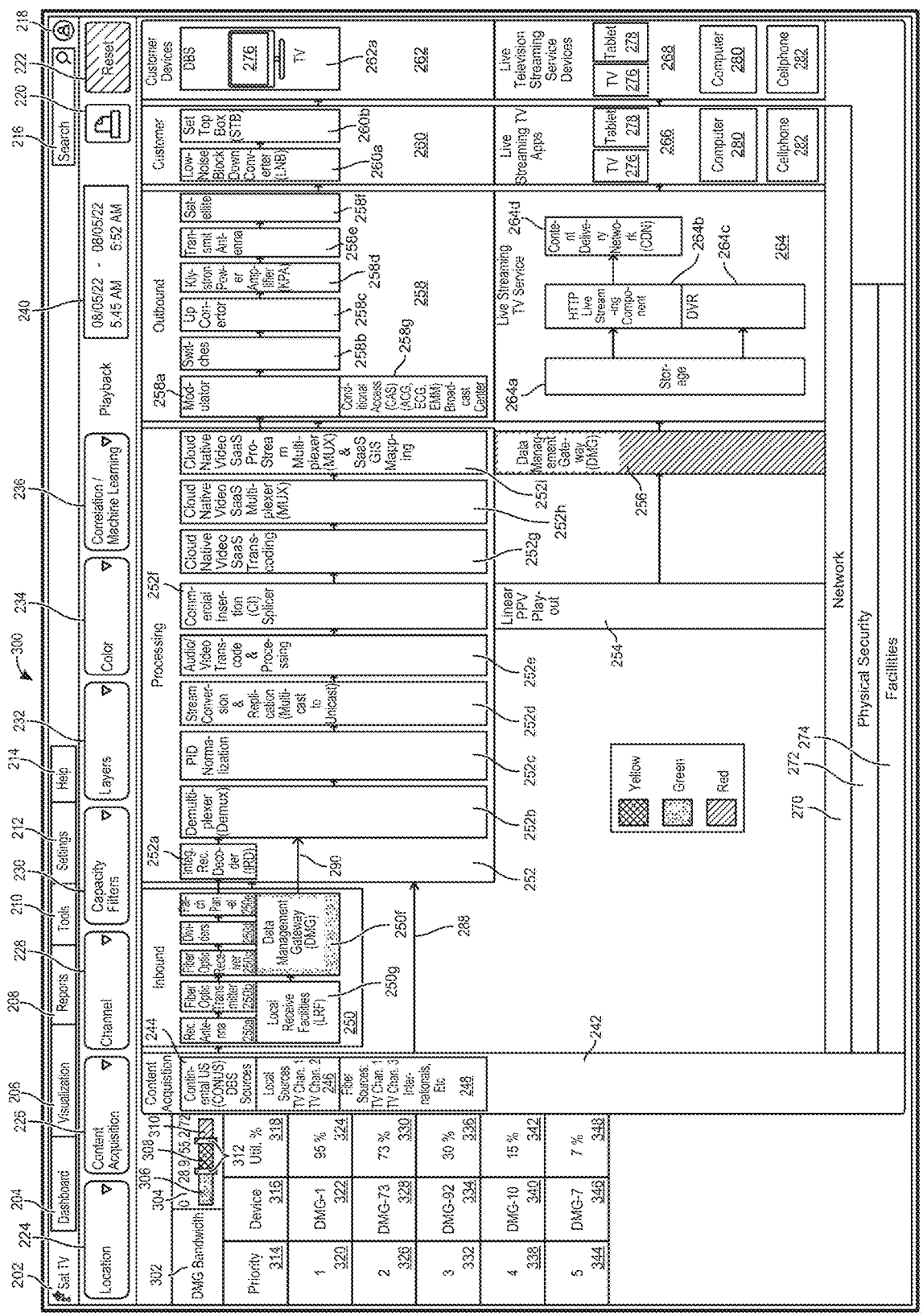
FIG. 3 shows a diagram of the graphical user interface in which a capacity filter has been implemented.

FIG. 3 shows a diagram 300 of the graphical user interface in which a capacity filter 304 has been implemented. In general, in some examples, the graphical user interface displays an option for toggling a capacity filter and the capacity filter, when toggled, adjusts a display of each modular alarm unit of the plurality of modular alarm units such that a capacity level for each modular alarm unit is indicated. For example, drop-down menu 230 may enable the user to toggle the display or insertion of capacity filter 304 and its associated graphical user interface components, as shown within diagram 300.

Diagram 300 essentially repeats diagram 200, except that a modular alarm unit selector 302 as well as capacity filter 304 and corresponding values 314-318, have been inserted. The insertion of these elements has resulted in parts of the remainder of diagram 200 being shifted, in the example of diagram 300, as shown. Modular alarm unit selector 302 enables a user to choose a particular type of modular alarm unit in scenarios where multiple instances of such a type of modular alarm unit may be presented within the corresponding graphical user interface. Similarly, capacity filter 304 may enable the user to select one or more rules or methodologies for adjusting how the different instances of the selected type of modular alarm unit are displayed within the graphical user interface based on a level of capacity, bandwidth, or other utilization metric. In the particular example of this figure, two adjustable bars 312 enable the user to set thresholds or boundaries between three separate colors, as shown, along a scale or metric corresponding to the utilization level or percentage at that particular instance of the type of modular alarm unit. Specifically, the two adjustable bars 312 effectively create three separate regions or sub-spectrums, in terms of utilization percentages, where a first region corresponds to 0% through 28.9% utilization, a second region corresponds to 28.9 through 55.2% utilization, and a third region corresponds to 55.2 through 72% utilization. Moreover, the example of this figure also illustrates how, within values 314-348, different instances of the same type of device and/or corresponding modular alarm unit ("DMG Bandwidth") can be color-coded, or otherwise displayed in an adjusted manner reflecting the application of capacity filter 304, differently based upon where the utilization percentage for each of these instances falls along the three separate regions identified by adjustable bars 312. Diagram 300 also further illustrates how data management gateway 250f and data management gateway 256 are color-coded consistent with capacity filter 304 due to the fact that these particular instances of that type of modular alarm unit have utilization percentages falling within the corresponding sub-ranges defined by adjustable bars 312.

In the example of this figure, two adjustable bars have been used to indicate three separate regions, which have been adjusted in the display according to a color-coded scheme. In other examples, one or more of these features may be substituted, replaced, or adjusted, as understood by those having skill in the art. For example, rather than three separate regions, any suitable number of regions might be used. Similarly, rather than using adjustable bars, any suitable graphical user interface subcomponent, wizard, and/or other user input element may be used. Furthermore, rather than adjusting the display in a binary manner indicating separate discrete regions, the display may be adjusted continuously or in a granular manner. Lastly, rather than using a color coding scheme, the graphical user interface can adjust the display using any suitable mechanism or technique such that the modular alarm units that are identified or picked out by the capacity filter are thereby highlighted to the attention of the user. These mechanisms can include audio alerts, animations, static icon insertions or indicators, and/or any other suitable mechanism, within a graphical user interface, for drawing the user's attention to the particular modular alarm units that have been highlighted by the capacity filter, as further discussed above.

Capacity filter 304 may beneficially enable one or more users or administrators to better plan infrastructure placement, configuration, updating, and/or enhancement, etc. As shown within diagram 300, values 314-348 may indicate a ranked hierarchy, in terms of priority, between different instances of devices having the same type. In some examples, as shown, higher priority devices may have higher levels of utilization. By further drawing to the user's attention those instances of the particular type of device, each user can better appreciate or ascertain which instances of devices and/or types of devices will benefit from increased provisioning of capacity or increased numbers of instances, etc., to thereby compensate for, or to help address, overutilization, network congestion, and/or other stressors during the production cycle for a product or service.

Figure 4:
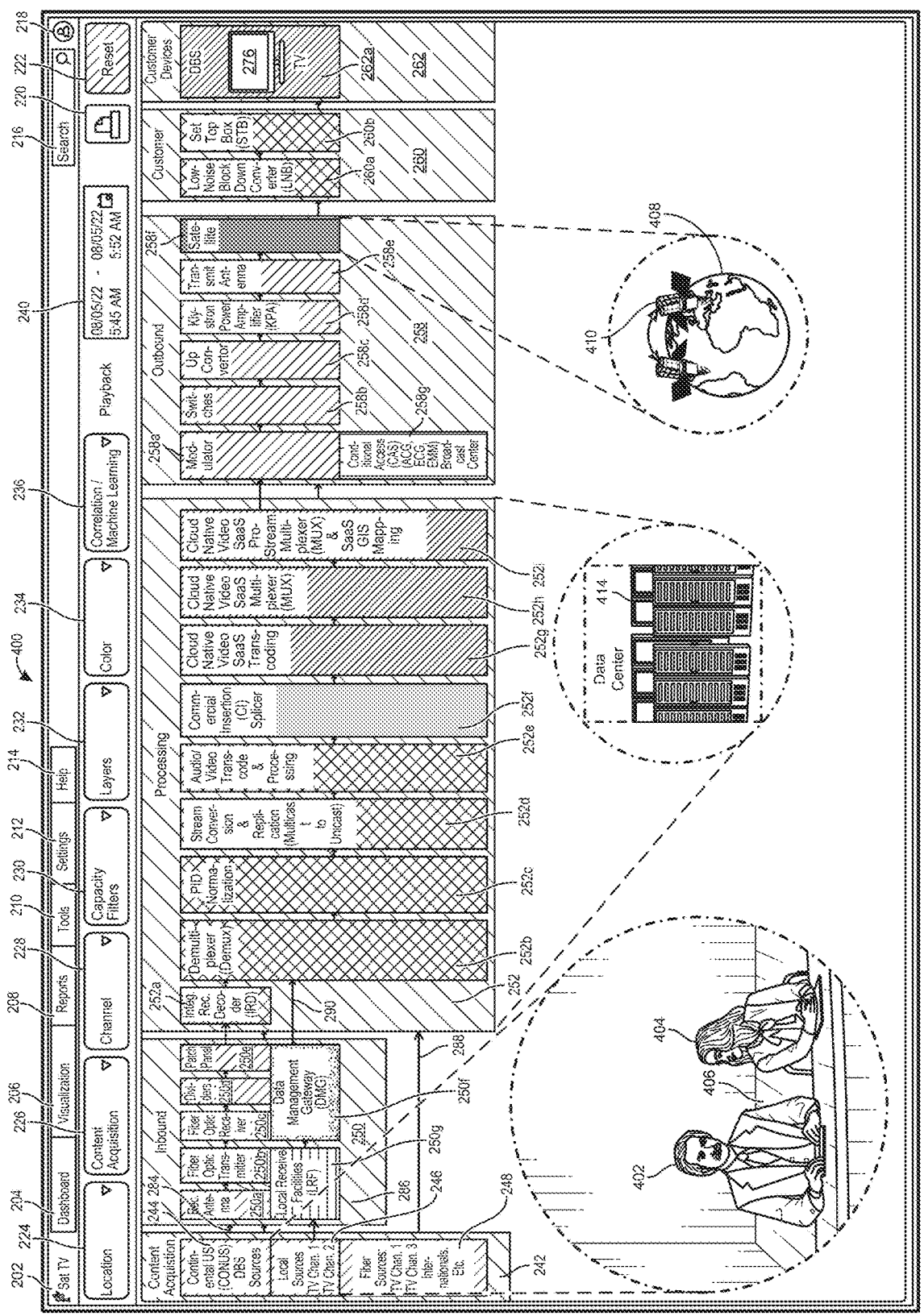
FIG. 4 shows a figurative diagram that illustrates the context around different subsystems that provide alarm information to the modular alarm interface.

FIG. 4 shows a figurative diagram 400 that illustrates the context around different subsystems that provide alarm information to the modular alarm interface. As further shown within this figure, local sources 246 may correspond to local television stations providing local television news broadcasting. Accordingly, local sources 246 may be associated, in this figurative diagram, with a newsroom employee 402 and a newsroom employee 404. Similarly, satellite 258f is associated with satellite 410, which can be orbiting around a figurative diagram of the globular earth 408, as shown. Lastly, processing 252 may correspond to processing by a data center including a rack of backend servers, such as a data center 414, as shown.

Diagram 400 helps to illustrate how the graphical user interface may unify a large multitude of different subsystems even when these subsystems are significantly different from each other or separated from each other. All of these different subsystems can be unified in a "single pane of glass" for more convenient ease of understanding and interactivity with the user. Accordingly, the user benefits from having a streamlined single view into a large variety of dramatically different and separated subsystems, all within the same graphical user interface, as shown.

Figure 5:
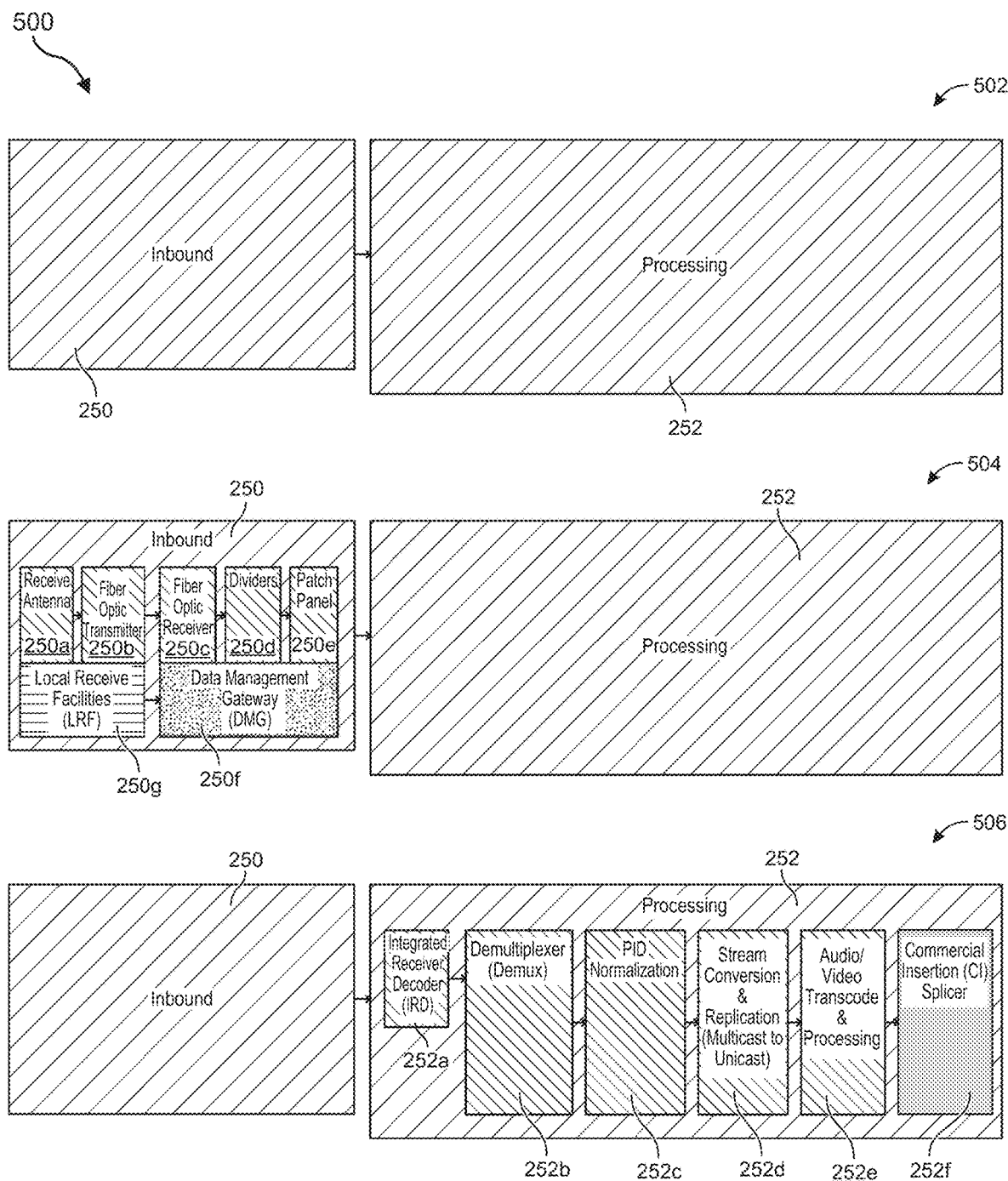
FIG. 5 shows a series of diagrams indicating how the modular alarm interface may implement a layer filter.

FIG. 5 shows a series 500 of a diagram 502, a diagram 504, and a diagram 506 indicating how the modular alarm interface may implement a layer filter. In particular, in some examples, the graphical user interface displays an option for toggling a layer filter and the layer filter, when toggled, adjusts a display of each modular alarm unit of the plurality of modular alarm units such that any modular alarm units that are included within a predefined layer are filtered from displaying. The option displayed by the graphical user interface can correspond to drop-down menu 232 in diagram 200, as further discussed above.

First, diagram 502 corresponds to a scenario where two separate layer filters have been toggled, thereby filtering from display the corresponding layers of modular alarm units. In the example of this diagram, the first layer corresponds to the lower-level modular alarm units that are included within inbound 250 and the second layer corresponds to the lower-level modular alarm units that are included within processing 252. Accordingly, within diagram 200, inbound 250 and processing 252 are shown as large uniform colored blocks without any internal or lower-level modular alarm units. In contrast, diagram 502 corresponds to a scenario where a first layer of lower-level modular alarm units within inbound 250 has been toggled on for display, whereas the second layer corresponding to the lower-level modular alarm units within processing 252 remains hidden, as shown. Lastly, diagram 206 corresponds to a reverse scenario in which the layer corresponding to inbound 250 has been toggled for filtering and the layer corresponding to processing 252 has been toggled for display. In some examples, one or more layer filters may be user defined or user customizable. For example, the user or administrator may select any suitable permutation of modular alarm units, no matter how otherwise disconnected or unrelated to each other, and bind them together as part of the same layer for purposes of using the layer filter. Additionally, or alternatively, the modular alarm interface may optionally suggest, recommend, or autocomplete one or more layers, such as by suggesting that a particular modular alarm unit should be included within a particular layer due to the fact that the modular alarm interface understands that the particular modular alarm unit has a relationship or connection with one or more remaining modular alarm units that are already within the layer. Such relationships or connections may include dependency relationships, as discussed above, and/or any other statistical or other pattern-related associations.

The diagrams within FIG. 5 also help illustrate how, in some examples, the graphical user interface defines a parent-child relationship hierarchy for the plurality of modular alarm units and the graphical user interface enables zooming in or out to render visible or invisible one or more members of the plurality of modular alarm units based on how deep a level of zoom is achieved. In other words, the differences between higher level modular alarm units and lower-level modular alarm units, as shown within the diagrams of FIG. 5, help to illustrate how such parent-child relationships can be formed and recorded within the modular alarm interface. By way of illustrative example, inbound 250 may correspond to a higher level within a parent-child hierarchy, whereas it forms composition relationships with its component lower-level modular alarm units, including receiving antenna 250a, fiber optic transmitter 250b, fiber optic receiver 250c, dividers 250d, patch panel 250e, local receive facilities 250g, and data management gateway 250f. Accordingly, from the perspective of the user, the relationship between higher level modular alarm units and lower-level modular alarm units can form a hierarchy that extends into the depth of the modular alarm interface. In other words, a corresponding relationship arrow would be pointing from inside of the modular alarm interface in the direction of the user. By analogy, the modular alarm interface may only display a slice of the overall hierarchy or arrangement of modular alarm units at a particular depth according to the parent-child relationships. Accordingly, the user may have the option to select or toggle a particular higher level modular alarm unit, such as inbound 250, and thereby dive deeper, according to the parent-child relationships, to gain visibility into the children's nodes that are connected through these particular parent-child relationships. More specifically, the user may toggle a particular modular alarm unit, or otherwise increase a level of zoom within the modular alarm interface, to thereby dive deeper within the parent-child relationship hierarchy and thereby bring one or more lower-level modular alarm units into view, as discussed above.

In some examples, the dependency relationships discussed above and the parent-child relationships may overlap. In the example of FIG. 5, inbound 250 may depend on one or more of the lower-level modular alarm units that are included within inbound 250 and that are related to inbound 250 in parent-child relationships. Thus, in addition to the dependency relationships indicated by the horizontal or lateral arrows shown within FIG. 5, there may also be implicit arrows diving into the depth of the graphical alarm interface, as discussed above, indicating corresponding dependency relationships. In other examples, the parent-child relationships and the dependency relationships may be conceptually separated, such that the parent-child relationships can indicate composition relationships without necessarily indicating a dependency relationship, a causal relationship, or a chronological relationship, as discussed above.

Figure 6:
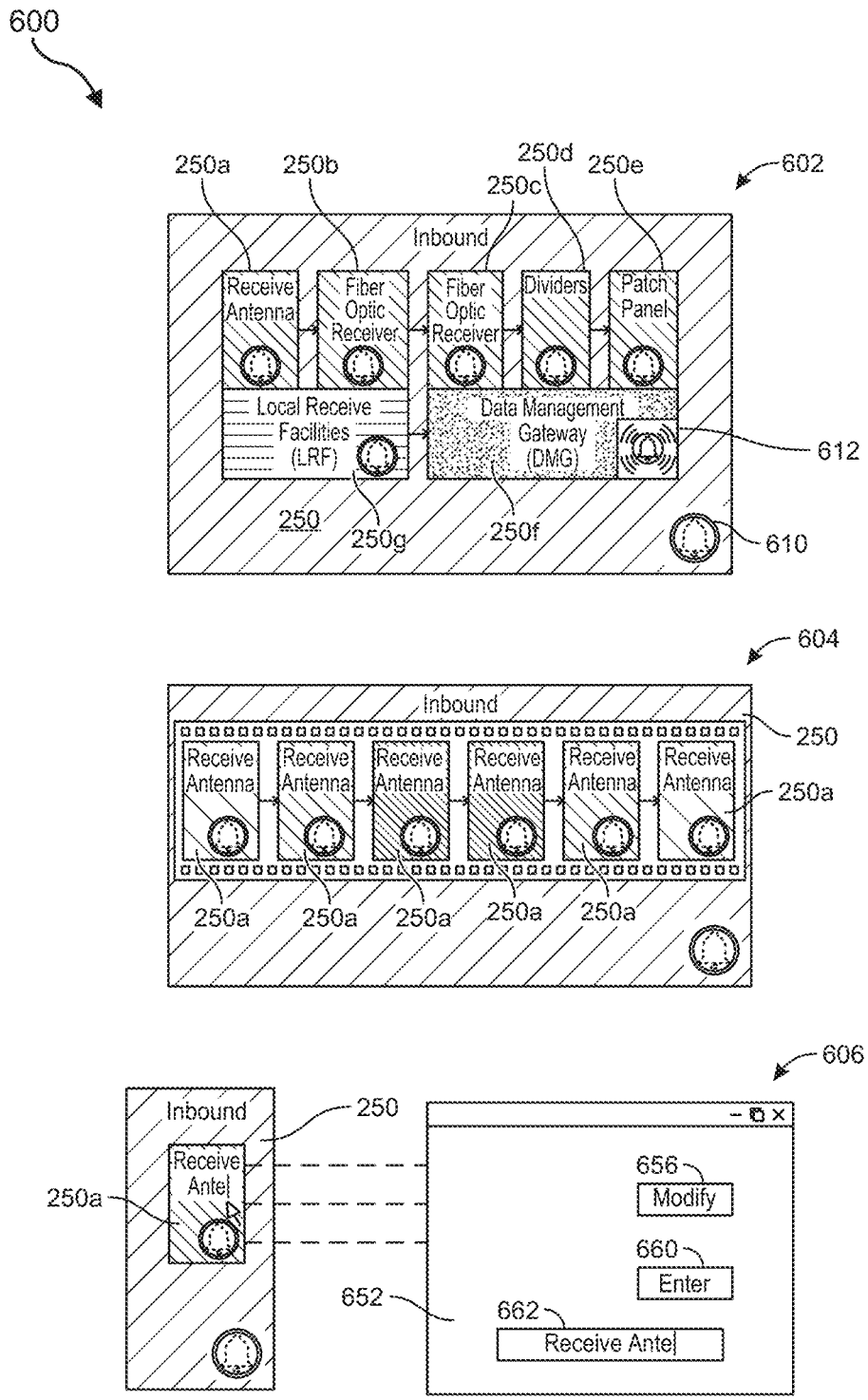
FIG. 6 shows a diagram indicating how an alarm may alert within a modular alarm unit, a diagram indicating an animated alarm, and a diagram indicating how text for a modular alarm unit may be manually edited by a user.

FIG. 6 shows a series 600 of a diagram 602 indicating how an alarm may alert within a modular alarm unit, a diagram 604 indicating an animated alarm, and a diagram 606 indicating how text for a modular alarm unit may be manually edited by a user. In various examples, the alert includes a static color, an animated alarm, or an audio alarm, as discussed in more detail below.

Diagram 602 shows how each one of multiple modular alarm units may include an alarm indicator, such as an alarm indicator 612 and an alarm indicator 610. Alarm indicator 612 is included within data management gateway 250f, as shown, whereas alarm indicator 610 is included within inbound 250. The various modular alarm units may optionally include such a graphical or other indication corresponding to the alarm. The alarm indicator may be dormant when the alarm is not sounding or otherwise triggered. For example, alarm indicator 610 within inbound 250 is shown within a dormant state such that the corresponding alarm is not actually sounding or triggered at that time. In contrast, diagram 602 shows that alarm indicator 612 has been triggered and is sounding. Accordingly, alarm indicator 612 may also optionally result in an audio alarm being output.

More generally, the alarm indicator may correspond to any graphical or other output that differentiates the corresponding modular alarm unit to thereby indicate to a user that the modular alarm unit is sounding an alarm. The alarm indicator may take any one of a variety of different forms. Rather than showing a somewhat literal icon for an alarm, such as alarm indicator 612 and alarm indicator 610, the alarm indicator may simply correspond to a static color of the specific modular alarm unit. Moreover, although diagram 200 shows the different modular alarm units having different colors according to their corresponding departments or groupings within an organization chart, as discussed above, a different static or dynamic color might be displayed differentially to indicate to the user that a particular modular alarm unit has an alarm that is sounding or alerting at that time. For example, the color may correspond to red thereby indicating danger to the user.

Additionally, or alternatively, rather than a static color in some examples the alarm indicator may be animated. Diagram 604 shows a figurative animation of how the color within the corresponding modular alarm unit of receive antenna 250a may be continuously transitioning, over time, from a lighter color to a darker color, and back again, which is indicated by the increasing or decreasing frequency or thickness of the black-and-white lines shown within this particular diagram. Diagram 604 also further shows how, while the color may be flashing red or otherwise continuously changing back-and-forth, as shown, one or more alarm indicators may also be included or displayed within the modular alarm unit, and may further include a graphical indication of alerting, as discussed above in connection with diagram 602.

In some examples, the graphical user interface enables a user to edit a name of the respective and different subsystem. Accordingly, diagram 606 shows that a graphical user interface window 652 may include a modify button 656, an enter button 660, and an input component 662, as shown. Input component 662 may enable the user to manually edit or modify one or more strings of text or other portions of the corresponding modular alarm unit. In this example, the user may be editing the name of the modular alarm unit, as shown.

Figure 7:
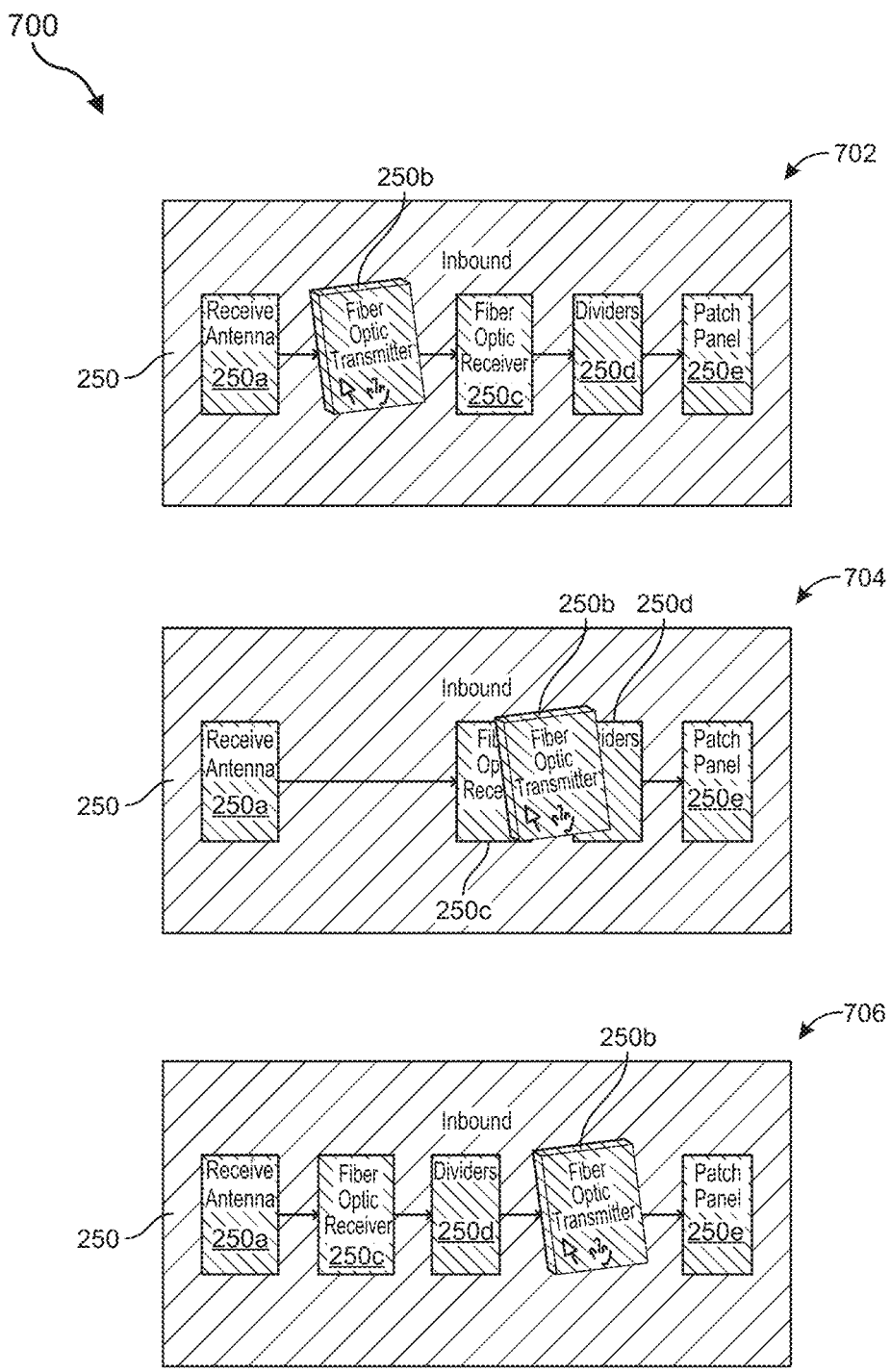
FIG. 7 shows a series of diagrams indicating how a modular alarm unit may be relocated according to a drag-and-drop operation performed by the user.

FIG. 7 shows a series 700 of a diagram 702, a diagram 704, and a diagram 706 of diagrams indicating how a modular alarm unit may be relocated according to a drag-and-drop operation performed by the user. As further shown in this figure, a user may use an input device, such as a mouse, to toggle or select a particular modular alarm unit, such as fiber-optic transmitter 250b. Diagram 702, diagram 704, and diagram 706 show in series an animation whereby the user may perform a drag-and-drop operation that relocates fiber-optic transmitter 250b from between receive antenna 250a and fiber-optic receiver 250c to a different location between dividers 250d and patch panel 250e. In practice, fiber-optic transmitter 250b would generally be located chronologically prior to fiber-optic receiver 250c, while nevertheless series 700 demonstrates the abilities of the corresponding graphical user interface or modular alarm interface to enable a user to arbitrarily rearrange modular alarm units.

In some examples, the graphical user interface automatically updates, as a default, information that indicates a dependency relationship between the first modular alarm unit and a second modular alarm unit in response to the drag and drop operation. Thus, in the example of series 700, the modular alarm interface has automatically and/or intelligently readjusted or reconnected the corresponding arrows indicating dependency relationships such that these arrows now connect dividers 250d on the left side of fiber-optic transmitter 250b and patch panel 250e on the right side of fiber-optic transmitter 250b, as shown within diagram 706. Accordingly, the modular alarm interface may intelligently recommend or auto complete dependency relationships in response to one or more user input commands or interactions with the modular alarm unit.

Figure 8:
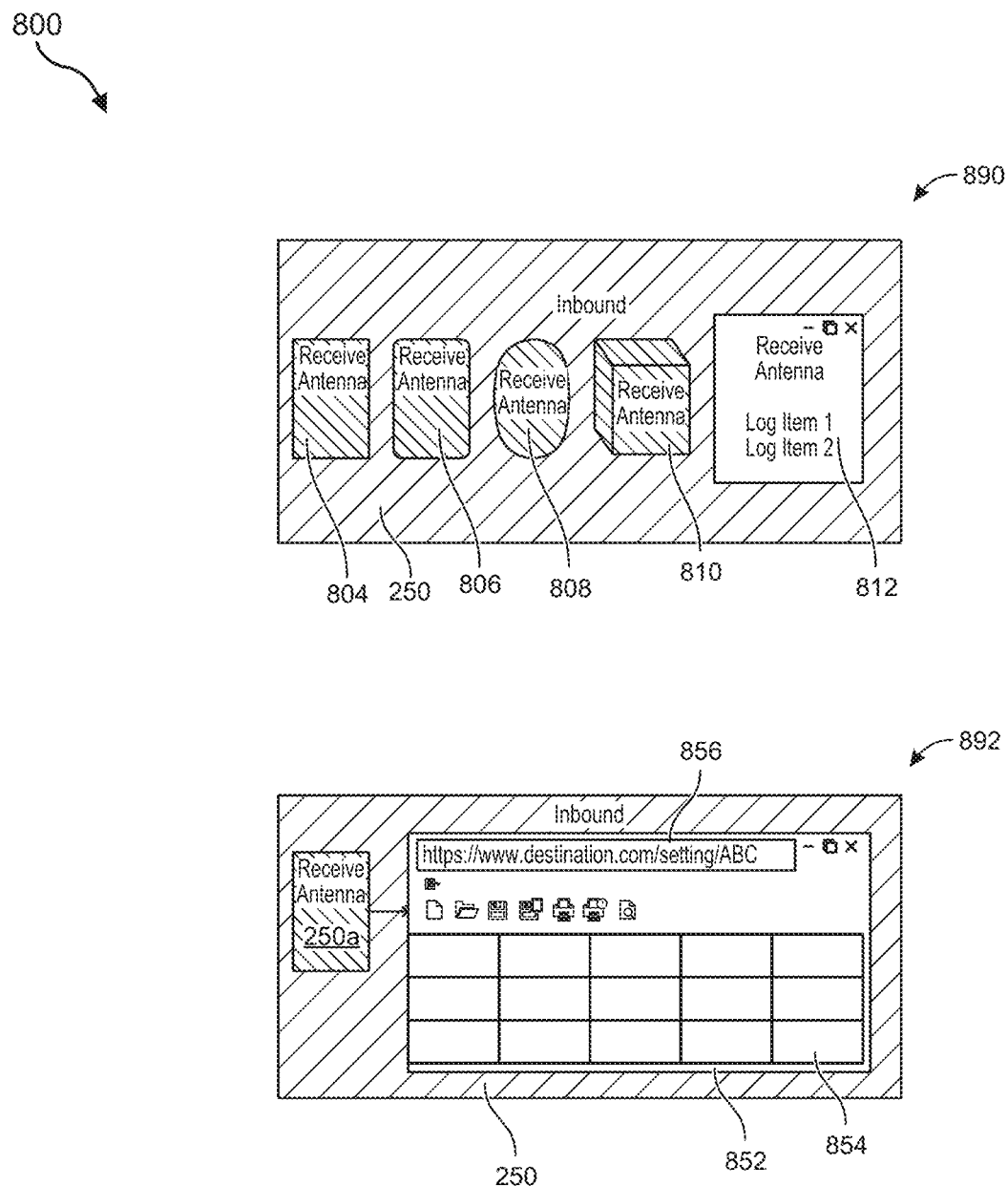
FIG. 8 shows a diagram indicating examples of different shapes or sizes for modular alarm units, as well as a diagram indicating how a modular alarm unit may include a hyperlink to a website for editing settings associated with a corresponding subsystem.

FIG. 8 shows a diagram 890 indicating examples of different shapes or sizes for modular alarm units, as well as a diagram 892 indicating how a modular alarm unit may include a hyperlink to a website for editing settings associated with a corresponding subsystem. In particular, diagram 890 shows how the modular alarm unit may take on any one of a variety of different forms. Modular alarm unit 804 may correspond to a simple two-dimensional rectangle. Nevertheless, modular alarm unit 806 may have rounded corners rather than sharper perpendicular corners. Modular alarm unit 808 may form an oval shape. Rather than being two-dimensional, modular alarm unit 810 may be displayed to indicate a three-dimensional shape and/or may be displayed within a three-dimensional interface such as an augmented reality or virtual reality subsystem. Lastly, in addition to including a name or identifier, such as "Receive Antenna," modular alarm units may also optionally include one or more other items of data. The modular alarm units may include alarm indicators, as discussed above in connection with FIG. 6. In the example of diagram 890, modular alarm unit 812 may display or output an arbitrary item of log information, as shown. Additionally, or alternatively, in other examples the modular alarm unit may output an animation, a live video feed or stream, a strolling ticker of news information, and/or any other suitable item of information that may be beneficial for the consumption of the viewer when interacting with the modular alarm interface.

In some examples, each respective and different modular alarm unit includes a hyperlink to a website that enables editing of the respective and different subsystem that contributes to a same production cycle of a product or service. Diagram 892 shows how each modular alarm unit may include a hyperlink or other link to a destination enabling a user to further interact with, or consume information from, the subsystem that corresponds to that specific modular alarm unit. In the example of diagram 892, the modular alarm unit may include a hyperlink to a website that enables the user to adjust one or more values for corresponding settings of the subsystem, such as settings that are specified within a spreadsheet application, as shown. In this example, the link may form a hyperlink and the website may form a corporate internal website to which the user of the modular alarm interface has access privileges. In some examples, the name or identifier within the modular alarm unit may be formatted to function as a link or hyperlink. Accordingly, when the user clicks "Receive Antenna" within diagram 892, this action or input command can trigger the modular alarm interface, or a browser, to bring up the corresponding website 852, including a series of spreadsheet cells such as a cell 854, as shown. Additionally, or alternatively, the website or other destination application may provide any other suitable mechanisms for consuming information from the subsystem that contributes to the production cycle of a product or service or for adjusting corresponding settings within that subsystem.

Figure 9:
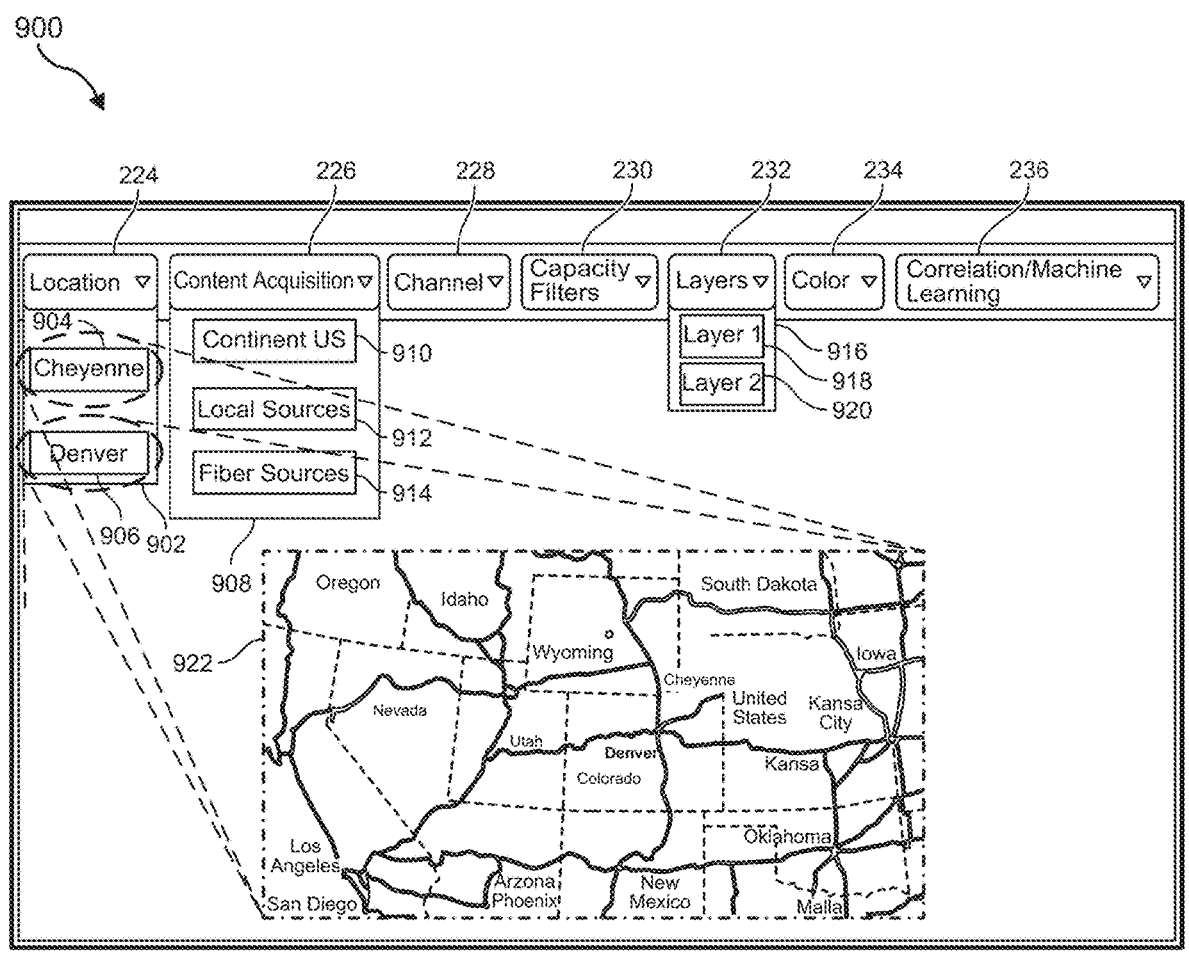
FIG. 9 shows a diagram illustrating examples of different drop-down menus and their corresponding functionality within the modular alarm interface.

FIG. 9 shows a diagram 900 illustrating examples of different drop-down menus and their corresponding functionality within the modular alarm interface. As further shown within this diagram, drop-down menu 224 may include illustrative examples of locations, such as a location 904 and a location 906, which the user can select or toggle, thereby triggering the modular alarm interface to display modular alarm units that are associated with a particular location in a differential manner, as further discussed above. Figurative diagram 900 shows an illustrative example of a map 922, in which the different locations corresponding to drop-down menu 224 can be seen. By way of example, one location may correspond to backend data servers that are associated with the production cycle of a product or service, whereas a second location may be associated with the final packaging of a particular product, etc.

Drop-down menu 226 enables the user to select or toggle between a higher level modular alarm unit in the form of content acquisition 242 or, instead, one or more of the lower level modular alarm units that are nested inside of content acquisition 242 in parent-child relationships, as further discussed above. In the example of diagram 900, a drop-down menu for content acquisition 242 and its subcomponent modular alarm units has been included, but in other examples additional drop-down menus may be included to enable the user to toggle between any one or more of the various higher level modular alarm units, and there corresponding subcomponent modular alarm units, within the same module alarm interface. In other words, the inclusion of content acquisition 242 is used as an example whereas the modular alarm interface may include drop-down menus or another graphical user interface element to enable the user to filter the display of the modular alarm interface in a parallel manner for any other higher level modular alarm unit and its corresponding subcomponents. Thus, selecting the higher level modular alarm unit may effectively trigger a filter that filters the subcomponents from display. Similarly, selecting one of the subcomponent modular alarm units within the higher level modular alarm unit may trigger the display of that specific subcomponent modular alarm unit while nevertheless filtering from display the remaining subcomponent modular alarm units.

A drop-down menu 228 may enable the user to select between different channels in the context of direct broadcast satellite services, as discussed above in connection with diagram 200. As further shown within diagram 200, such channels might include TV Channel 1, TV Channel 2, etc. (see local sources 246 within diagram 200). Drop-down menu 230 may correspond to capacity filters, as discussed above in connection with diagram 200, and may enable the user to select or toggle one or more different types of modular alarm units to thereby interact with a corresponding capacity filter for that type of modular alarm unit. Drop-down menu 232 may enable the user to focus on, or filter away, one or more user-customizable layers according to a layer filter, as discussed above in connection with diagram 500. Drop-down menu 234 may trigger the color coding of the various modular alarm units according to their assigned departments or categories within an organization hierarchy or organization chart, as discussed above in connection with diagram 200. Lastly, drop-down menu 236 may enable the user to toggle on or off an interface that enables the user to interact with a machine learning component in the context of the modular alarm interface, including the usage of either supervised machine learning or unsupervised machine learning, as further discussed above.

Figure 10:
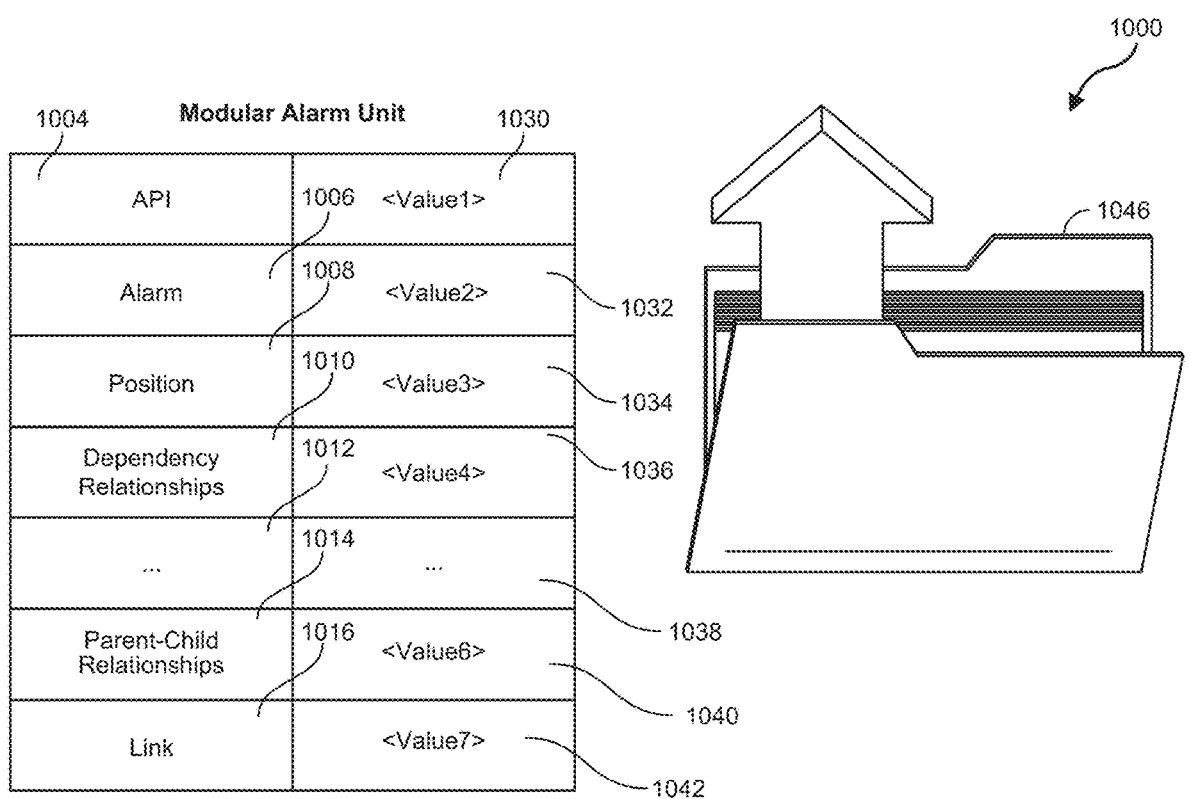
FIG. 10 shows a figurative diagram indicating contents or fields within a data structure for a modular alarm unit.

FIG. 10 shows a figurative diagram 1000 indicating contents or fields within a data structure for a modular alarm unit. One or more of these fields may be optional. In some examples, the data structure may be stored within a file or container 1046, as shown. The data structure may include an application programming interface 1004. The application programming interface may provide an interface that is specific to, or customized for, interacting with a subsystem that is contributing to a particular product or service, as discussed above. For example, the various devices, computing systems, and/or other components that are contributing to the design of a product or service may be different than those that are associated with the testing of the product or service, which might also be different from those that are associated with the packaging of a specific product, etc. Thus, although each of these different subsystems may contribute to the overall production cycle of the product or service, and all of these different subsystems might provide output information that can be shared with the modular alarm interface and potentially trigger an alarm when a threshold is reached according to a performance metric, as discussed above, the various subsystems may nevertheless need customizable or subsystem-specific application programming interfaces with which to report or communicate this information to a centralized modular alarm interface.

Additionally, or alternatively, the data structure for a modular alarm unit may include information describing or establishing alarm 1006. Alarm 1006 might specify both the threshold beyond which the alarm is triggered or sounding as well as the scale along which this threshold is measured. For example, alarm 1006 might define a percentage level of defective packaging instances from a packaging subsystem associated with the modular alarm interface. In contrast, as another example, alarm 1006 might define a bandwidth threshold for an internal server associated with providing a product or service such that the alarm will sound or trigger when that bandwidth threshold is crossed, thereby indicating a higher level of network congestion along the production cycle for this particular product or service.

Diagram 1000 also shows how the data structure for the modular alarm unit may include a position 1008 for the modular alarm unit within the modular alarm interface. For example, position 1000 may specify horizontal and/or vertical coordinates within a two-dimensional graphical user interface or other interface. As discussed above, the location or position may be user adjustable such that the user may manipulate an input device such as a mouse or other input device to relocate or adjust the position of a corresponding modular alarm unit.

Diagram 1000 also shows how the data structure for a modular alarm unit may include dependency relationships 1010, which may correspond to the dependency relationships discussed above in connection with diagram 200. As further discussed above, these dependency relationships may be entered either automatically and intelligently by the modular alarm interface and/or may be entered manually by the user using a corresponding graphical user interface or other wizard or input component. Field 1012 is included within diagram 1000 for illustration purposes to indicate that one or more of the fields shown within this diagram are merely illustrative and, in other examples, one or more additional fields may be included or removed as appropriate.

Diagram 1000 also further shows how the data structure for a modular alarm unit may include information describing or defining parent-child relationships 1014, as discussed above in connection with diagram 500, for example. Lastly, diagram 1000 shows how the data structure for a modular alarm unit may include a link 1016 that specifies the destination or target for browser or inter-application navigation where the user can further consume information from a subsystem and/or adjust one or more settings for that subsystem that is associated with that particular modular alarm unit, as discussed above in connection with diagram 892.

Figure 11:
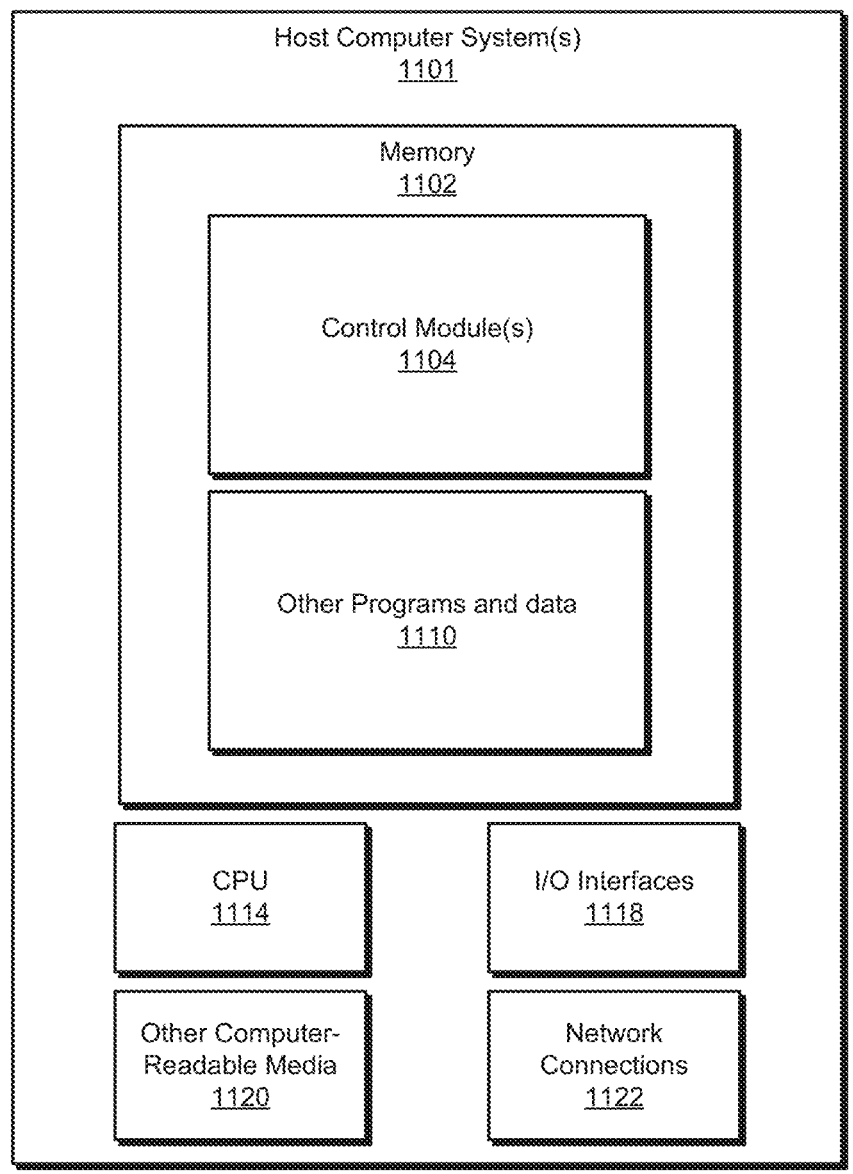
FIG. 11 shows an example computing system that may facilitate the performance of one or more of the methods described herein.

FIG. 11 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 11 illustrates an example of underlying hardware on which such software and functionality may be hosted and/or implemented.

In particular, shown is example host computer system(s) 1101. For example, such computer system(s) 1101 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 1101 may include memory 1102, one or more central processing units (CPUs) 1114, I/O interfaces 1118, other computer-readable media 1120, and network connections 1122.

Memory 1102 may include one or more various types of non-volatile and/or volatile storage technologies. Examples of memory 1102 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1102 may be utilized to store information, including computer-readable instructions that are utilized by CPU 1114 to perform actions, including those of embodiments described herein.

Memory 1102 may have stored thereon control module(s) 1104. The control module(s) 1104 may be configured to implement and/or perform some or all of the functions of the systems or components described herein. Memory 1102 may also store other programs and data 1110, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1122 are configured to communicate with other computing devices to facilitate the functionality described herein. In various embodiments, the network connections 1122 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1118 may include a video interface, other data input or output interfaces, or the like. Other computer-readable media 1120 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
providing a graphical user interface that includes a plurality of modular alarm units that are each directed to a respective and different subsystem that contributes to a same production cycle of a direct broadcast satellite product or service and that are each connected to at least one other modular alarm unit in the plurality of modular alarm units via a respective dependency relationship;
for each modular alarm unit of the plurality of modular alarm units:
monitoring the respective and different subsystem to which the modular alarm unit is directed; and
generating an alert when a status of the respective and different subsystem is deficient according to a respective metric;
receiving user input indicating a rearrangement of an orientation of the plurality of modular alarm units;
in response to receiving the user input indicating the rearrangement:
updating the graphical user interface by rearranging the orientation of the plurality of modular alarm units based on the user input indicating the rearrangement; and
modifying at least one dependency relationship between two modular alarm units of the plurality of modular alarm units based on the user input indicating the rearrangement; and
based on the modified at least one dependency relationship, determining an origin of an issue causing respective alerts generated for multiple alarm units of the plurality of modular alarm units.

2. The method of claim 1, wherein:
a supervised machine learning model is trained on a corpus of data that is labeled to indicate dependency relationships within the plurality of modular alarm units; and
the supervised machine learning model, after training, is configured to infer where one or more dependency relationships would exist in an unlabeled second corpus of data.

3. The method of claim 1, wherein at least three respective and different subsystems that contribute to the same production cycle for the direct broadcast satellite product or service include at least three of:
  a content acquisition subsystem;
  an inbound subsystem;
  a processing subsystem;
  an outbound subsystem; or
  a customer subsystem.

4. The method of claim 1, wherein the graphical user interface displays at least one of:
  an option for toggling a layer filter in which the layer filter, when toggled, adjusts a display of each modular alarm unit of the plurality of modular alarm units such that any modular alarm units that are included within a predefined layer are filtered from displaying; or
  an option for toggling a capacity filter, in which the capacity filter, when toggled, adjusts a display of each modular alarm unit of the plurality of modular alarm units such that a capacity level for each modular alarm unit is indicated.

5. The method of claim 1, wherein the graphical user interface enables a user to perform a drag and drop operation on a first modular alarm unit of the plurality of modular alarm units.

6. The method of claim 5, wherein the graphical user interface automatically updates, as a default, information that indicates a dependency relationship between the first modular alarm unit and a second modular alarm unit in response to the drag and drop operation.

7. The method of claim 1, wherein:
  the graphical user interface defines a parent-child relationship hierarchy for the plurality of modular alarm units; and
  the graphical user interface enables zooming in or out to render visible or invisible one or more members of the plurality of modular alarm units based on how deep a level of zoom is achieved.

8. The method of claim 1, wherein the alert comprises a static color, an animated alarm, or an audio alarm.

9. The method of claim 1, wherein the graphical user interface enables a user to edit a name of the respective and different subsystem.

10. The method of claim 1, wherein each respective and different modular alarm unit includes a hyperlink to a website that enables editing of the respective and different subsystem that contributes to the same production cycle of a product or service.

11. A system comprising:
  at least one physical computing processor of a computing device; and
  a non-transitory computer-readable medium that has instructions stored thereon that, when executed by the at least one physical computing processor, cause the computing device to perform operations including:
    providing a graphical user interface that includes a plurality of modular alarm units that are each directed to a respective and different subsystem that contributes to a same production cycle of a direct broadcast satellite product or service and that are each connected to at least one other modular alarm unit in the plurality of modular alarm units via a respective dependency relationship;
    for each modular alarm unit of the plurality of modular alarm units:
      monitoring the respective and different subsystem to which the modular alarm unit is directed; and
      generating an alert when a status of the respective and different subsystem is deficient according to a respective metric;
    receiving user input indicating a rearrangement of an orientation of the plurality of modular alarm units;
    in response to receiving the user input indicating the rearrangement:
      updating the graphical user interface by rearranging the orientation of the plurality of modular alarm units based on the user input indicating the rearrangement; and
      modifying at least one dependency relationship between two modular alarm units of the plurality of modular alarm units based on the user input indicating the rearrangement; and
    based on the modified at least one dependency relationship, determining an origin of an issue causing respective alerts generated for multiple alarm units of the plurality of modular alarm units.

12. The system of claim 11, wherein:
  a supervised machine learning model is trained on a corpus of data that is labeled to indicate dependency relationships within the plurality of modular alarm units; and
  the supervised machine learning model, after training, is configured to infer where one or more dependency relationships would exist in an unlabeled second corpus of data.

13. The system of claim 11, wherein at least three respective and different subsystems that contribute to the same production cycle for the direct broadcast satellite product or service include at least three of:
  a content acquisition subsystem;
  an inbound subsystem;
  a processing subsystem;
  an outbound subsystem; or
  a customer subsystem.

14. The system of claim 11, wherein the graphical user interface displays at least one of:
  an option for toggling a layer filter in which the layer filter, when toggled, adjusts a display of each modular alarm unit of the plurality of modular alarm units such that any modular alarm units that are included within a predefined layer are filtered from displaying; or
  an option for toggling a capacity filter, in which the capacity filter, when toggled, adjusts a display of each modular alarm unit of the plurality of modular alarm units such that a capacity level for each modular alarm unit is indicated.

15. The system of claim 11, wherein the graphical user interface enables a user to perform a drag and drop operation on a first modular alarm unit of the plurality of modular alarm units.

16. The system of claim 15, wherein the graphical user interface automatically updates, as a default, information that indicates a dependency relationship between the first modular alarm unit and a second modular alarm unit in response to the drag and drop operation.

17. The system of claim 11, wherein:
  the graphical user interface defines a parent-child relationship hierarchy for the plurality of modular alarm units; and
  the graphical user interface enables zooming in or out to render visible or invisible one or more members of the plurality of modular alarm units based on how deep a level of zoom is achieved.

18. The system of claim 11, wherein the alert comprises a static color, an animated alarm, or an audio alarm.

19. The system of claim 11, wherein the graphical user interface enables a user to edit a name of the respective and different subsystem.

20. A non-transitory computer-readable medium that has instructions stored thereon that, when executed by at least one physical computing processor, cause a computing device to perform operations including:
- providing a graphical user interface that includes a plurality of modular alarm units that are each directed to a respective and different subsystem that contributes to a same production cycle of a direct broadcast satellite product or service and that are each connected to at least one other modular alarm unit in the plurality of modular alarm units via a respective dependency relationship;
- for each modular alarm unit of the plurality of modular alarm units:
  - monitoring the respective and different subsystem to which the modular alarm unit is directed; and
  - generating an alert when a status of the respective and different subsystem is deficient according to a respective metric;
- receiving user input indicating a rearrangement of an orientation of the plurality of modular alarm units;
- in response to receiving the user input indicating the rearrangement:
  - updating the graphical user interface by rearranging the orientation of the plurality of modular alarm units based on the user input indicating the rearrangement; and
  - modifying at least one dependency relationship between two modular alarm units of the plurality of modular alarm units based on the user input indicating the rearrangement; and
- based on the modified at least one dependency relationship, determining an origin of an issue causing respective alerts generated for multiple alarm units of the plurality of modular alarm units.

* * * * *